United States Patent
Murthy et al.

(10) Patent No.: US 9,967,287 B2
(45) Date of Patent: May 8, 2018

(54) DETECTION OF OFFLINE ATTEMPTS TO CIRCUMVENT SECURITY POLICIES

(71) Applicant: AirWatch LLC, Atlanta, GA (US)

(72) Inventors: Varun Murthy, Atlanta, GA (US); Kalyan Regula, Alpharetta, GA (US); Shravan Shantharam, Cumming, GA (US); Jason Roszak, Brookhaven, GA (US)

(73) Assignee: AIRWATCH LLC, Atlanta, GA (US)

( * ) Notice: Subject to any disclaimer, the term of this patent is extended or adjusted under 35 U.S.C. 154(b) by 257 days.

(21) Appl. No.: 14/923,843

(22) Filed: Oct. 27, 2015

(65) Prior Publication Data
US 2017/0118246 A1  Apr. 27, 2017

(51) Int. Cl.
*H04L 29/06* (2006.01)
*G06F 21/62* (2013.01)

(52) U.S. Cl.
CPC .......... *H04L 63/20* (2013.01); *G06F 21/6218* (2013.01)

(58) Field of Classification Search
CPC .... G06F 21/6218; G06F 21/60; G06F 21/629; G06F 21/71; G06F 21/10; G06F 21/105; G06F 21/31; G06F 21/62; H04L 63/20
USPC ................................................. 726/1, 26–27
See application file for complete search history.

(56) References Cited

U.S. PATENT DOCUMENTS

| | | | | |
|---|---|---|---|---|
| 8,869,235 B2* | 10/2014 | Qureshi | ................ | H04L 63/20 713/150 |
| 9,032,520 B2* | 5/2015 | Banzhof | ............ | H04L 63/1433 726/22 |
| 2008/0178300 A1* | 7/2008 | Brown | ................ | G06F 21/6218 726/29 |
| 2011/0219434 A1* | 9/2011 | Betz | ........................ | G06F 21/00 726/5 |
| 2013/0167250 A1* | 6/2013 | Balasubramanian | ... | G06F 21/10 726/28 |
| 2015/0110035 A1* | 4/2015 | Lee | ........................ | H04W 12/08 370/329 |
| 2015/0288722 A1* | 10/2015 | Sweet | ................. | H04L 63/0428 726/1 |
| 2015/0312802 A1* | 10/2015 | Shah | ..................... | H04W 24/02 370/235 |
| 2016/0205139 A1* | 7/2016 | Davies | .................... | H04L 63/20 726/1 |
| 2016/0259835 A1* | 9/2016 | Rajagopalan | ..... | G06F 17/30575 |
| 2016/0330241 A1* | 11/2016 | Olivera | ................... | H04L 63/20 |
| 2016/0353258 A1* | 12/2016 | Stuntebeck | ............. | H04W 4/14 |

* cited by examiner

*Primary Examiner* — Shanto M Abedin
(74) *Attorney, Agent, or Firm* — Thomas Horstemeyer, LLP (57) ABSTRACT

Disclosed are approaches for detecting attempts to circumvent security policies on a client device. A deletion of a user account on a computing device is detected, wherein the deletion is initiated locally on the computing device and the user account is associated with an enrollment of the computing device with a management service. Data stored in a memory of the computing device that is subject to a policy received from the management service is identified. The data is deleted from the memory of the computing device. The policy is then deleted from the memory of the computing device.

20 Claims, 3 Drawing Sheets

DETECTION OF OFFLINE ATTEMPTS TO CIRCUMVENT SECURITY POLICIES

BACKGROUND

Companies are increasingly allowing employees and contractors to bring their own devices to work and access corporate data, email, and other information. Information technology departments need ways to manage these personal devices to ensure their security. Some operating system or device manufacturers have therefore started offering native device management software that provides basic functionality like the ability to remotely wipe corporate data from a personal device.

For many organizations, the basic functionality offered by native device management software does not adequately address their concerns. As a result, companies can require that employees install enhanced mobile device management software that provides more advanced configuration and protection.

For devices that already include native management and should also use enhanced management software, an issue arises with being able to detect whether the enhanced management software has been uninstalled. The device may not report an uninstall event to a server because the native agent locally stores whether it is enrolled. There is therefore a need to ensure that enhanced management software is active, and also to prevent a user from making any changes to the configuration settings of the enhanced management software. For example, a user can uninstall the software or delete a database stored on the device that indicates the device is enrolled with management software. The user can then bypass securities offered by the enhanced software by disabling firewall protections, turning off automatic software updates, and disabling other features designed to keep the device secure using the enhanced management software.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are several examples for detecting attempts to circumvent security policies on a client device. A client device can have an application, such as a management agent, installed to enforce security settings specified by one or more policies. These policies can specify, for example, specific applications or versions of applications to be installed on the client device, settings for when and how frequently updates are to be installed on the client device, restrictions regarding when and where a particular user can access content (e.g. documents, web pages, or other content), and potentially other settings. The management agent can enroll or register with a management service in order to receive these policies. The management service can also periodically send new or updated policies to the management agent for enforcement on the client device. In addition, a separate protection agent can also execute on the client device in order to prevent a user from circumventing the policies enforced by the management agent.

To prevent a user from changing the settings or configuration of the client device, the protection agent can periodically compare the settings of the client device to those specified in a respective policy. If the current values of the settings fail to match the values specified in the policy, the protection agent can request that the management agent enforce the policy, which would cause the management agent to change the values of the settings to match the values specified in the policy. In some instances, however, the protection agent can change the current values to match the values specified in the policy.

To prevent a user from modifying the policies enforced by the management agent, the protection agent can compare the policies being enforced by the management agent to copies of the policies only available to the protection agent. For example, a user can attempt to manipulate the management agent by changing the policies being enforced. Accordingly, the protection agent can periodically compare the version of the policies that the management agent is enforcing with copies of the policies only available to the protection agent. If the policies fail to match, the protection agent can replace the version of the policies that the management agent is enforcing with copies of the policies available to the protection agent.

In some instances, a user can delete a user account from the client device associated with the enrollment of the management agent with the management service. In order to prevent the management agent from reporting the removal of the user account to the management service, the user can delete the account while the client device is disconnected from a network (e.g. has its network interface disabled). A user can attempt this, for example, in order to bypass policy restrictions prohibiting access to data on the client device. Accordingly, the protection agent can be configured to detect the deletion of the user account and, in response, remove the protected data from the client device as well as reverse any configuration changes made by the management agent to enforce a policy. In some instances, the protection agent can also cause the management agent and the protection agent to be uninstalled from the computing device.

Figure 1:
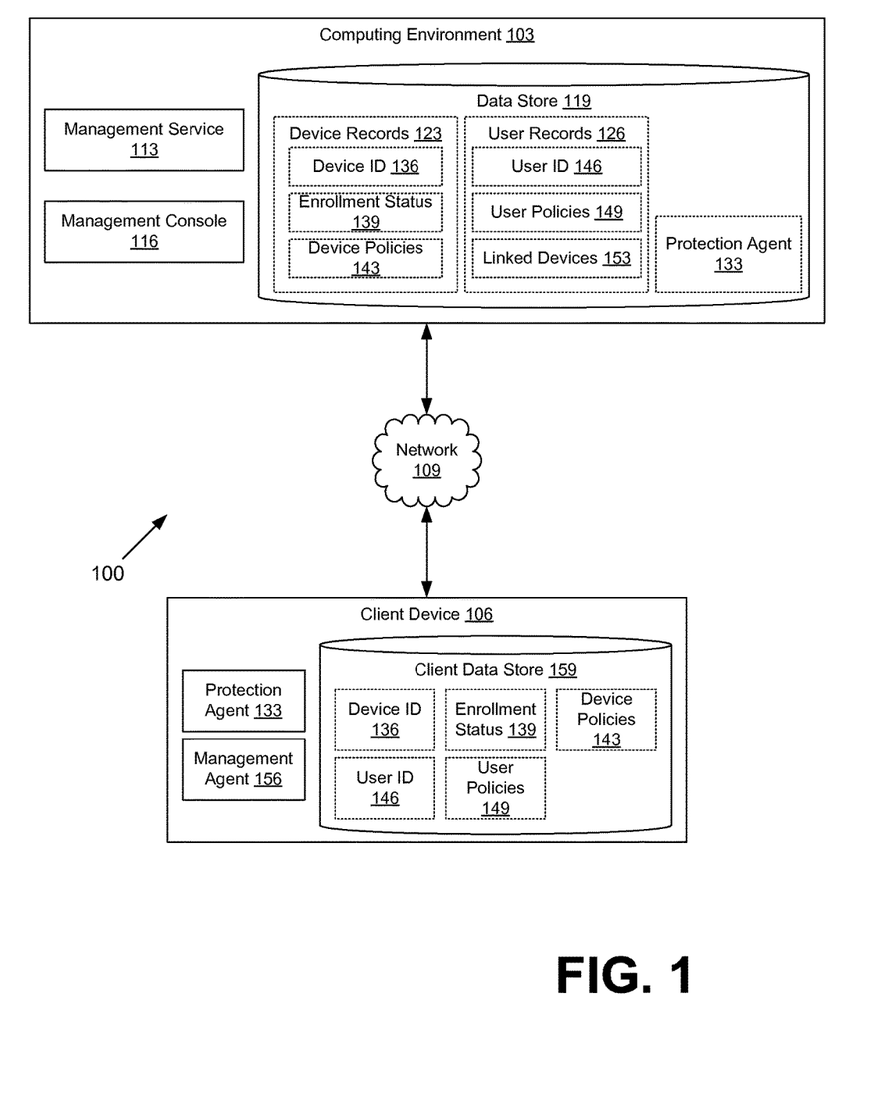
FIG. 1 is a schematic block diagram of a networked environment.

With reference to FIG. 1, shown is a networked environment 100 according to some examples. The networked environment 100 includes a computing environment 103, a client device 106, and potentially other devices, which are in data communication with each other over a network 109. The network 109 includes, for example, the Internet, intranets, extranets, wide area networks (WANs), local area networks (LANs), wired networks, wireless networks, or other suitable networks, or any combination of two or more networks. For example, the networks can include satellite networks, cable networks, Ethernet networks, and other types of networks.

The computing environment 103 can include a server computer or any other system providing computing capability. Alternatively, the computing environment 103 can employ a plurality of computing devices that can be arranged, for example, in one or more server banks, computer banks, or other arrangements. The computing devices can be located in a single installation or can be distributed among many different geographical locations. For example, the computing environment 103 can include a plurality of computing devices that together can correspond to a hosted computing resource, a grid computing resource, or any other distributed computing arrangement. In some cases, the computing environment 103 can correspond to an elastic computing resource where the allotted capacity of processing, network, storage, or other computing-related resources can vary over time.

The components executed on the computing environment 103 can include a management service 113, a management console 116, and other applications or functionality. The management service 113 can administer the operation of client devices 106 registered or otherwise enrolled with the management service 113. To this end, the management service 113 can enforce or otherwise require particular applications to be installed on an enrolled client device 106, require the client device 106 to be configured in a particular manner, or require that particular features be enabled or disabled on the client device 106, as further described below. The management console 116 can provide an administrative interface for configuring the operation of the management service 113 and the configuration of client devices 106 that are administered by the management service 113. Accordingly, the management console 116 can correspond to a web page or web application provided by a web server hosted in the computing environment 103.

The data store 119 can be representative of a plurality of data stores 119. The data stored in the data store 119 can include, for example, one or more device records 123, one or more user records 126, a copy of the protection agent 133, and potentially other data.

Device records 123 can represent information about client devices 106 that have been or are currently administered by the management service 113. For example, each client device 106 administered by the management service 113 can have at least one corresponding device record 123. A device record 123 can include a device identifier 136 for the corresponding client device 106, an enrollment status 139, and one or more applicable device policies 143.

A device identifier 136 can represent a unique identifier for the client device 106. For example, a device identifier 136 can include a serial number of the client device 106, a media access control (MAC) address of a network interface of the client device 106, a universally unique device identifier (UUID), a device fingerprint, or other identifier that can serve to uniquely identify the client device 106. In some instances, a device identifier 136 can include a combination of individual identifiers, such as a combination of a MAC address and a serial number.

The enrollment status 139 can represent the current status of the client device 106 with respect to the management service 113, such as "enrolled," "unenrolled," "pending," or similar enrollment statuses that reflect whether or to what extent a client device 106 is enrolled with the management service 113.

The device policies 143 represent one or more policies that are to be enforced for the client device 106 associated with the device record 123. Device policies 143 can include settings, permissions, or other configuration options that can be enforced when a client device 106 operates. For example, a device policy 143 can specify that a client device 106 have specific client applications installed or specific versions of client applications installed. A device policy 143 can further specify that the installed applications be configured in a particular manner or that certain settings for the installed applications be set to specified values. For example, a device policy 143 could require that an email client use encryption when connecting to a corporate serve. In some instances, a device policy 143 could require that a virtual private network (VPN) client have particular encryption algorithms enabled or disabled. A device policy 143 can also specify that particular device or operating system features be enabled or disabled. For example, the device policy 143 could specify that a client device 106 with MICROSOFT WINDOWS installed have BitLocker® drive encryption enabled. As another example, the device policy 143 could specify that a firewall integrated with the operating system of the client device 106 be enabled. In some instances, a device policy 143 can specify particular configuration settings, such as email account settings, network proxy settings, and other settings. For example, a device policy 143 could specify that a web browser send all traffic through a particular proxy server. As another example, a device policy 143 can specify that the client device 106 can only access certain content at certain times, while the client device 106 is in certain locations, or while the client device 106 is connected to particular networks 109. In some instances, a device policy 143 can also specify that certain cryptographic certificates be installed on the client device 106, as encryption certificates for secure communications, signing certificates to authenticate messages or applications sent to or received from the management service 113, as well as other certificates. In various instances, a device policy 143 could also specify that a password or passcode have a minimum length or be of a minimum complexity.

User records 126 represent information regarding individual users or owners of client devices 106. A user record 126 can include a user identifier 146 to uniquely identify a user, such as an account name and password, an email address, a phone number, or similar unique identifier. A user record 126 can also include one or more user policies 149 as well as a set of linked devices 153. User policies 149 represent one or more policies that are to be enforced for the client devices listed in the linked devices 153. For example, user policies 149 can be applied to a client device 106 which a user is currently logged into in order to enforce settings, permissions, or configuration options for the user. The list of linked devices 153 includes device records 123 of client devices 106 associated with a particular user. The client devices 106 can include client devices 106 registered or enrolled by the user, client devices 106 owned by the user, as well as client devices 106 currently in use by the user.

A copy of the protection agent 133 can also be stored in the data store 119. The protection agent 133 can be sent to the client device 106 for installation when a client device 106 enrolls or registers with the management service 113. The protection agent 133 can prevent unauthorized changes to settings or configuration details governed by applicable device policies 143 or user policies 149, as further described below.

The client device 106 can represent one or more client devices 106 coupled to the network 109. The client device 106 can correspond to a desktop computer, a laptop computer, personal digital assistants, cellular telephones, smartphones, set-top boxes, music players, web pads, tablet computer systems, game consoles, electronic book readers, or other devices with like capability. The client device 106 can be configured to execute applications, such as the protection agent 133, the management agent 156, or other applications.

The protection agent 133 can prevent a user from, for example, modifying device policies 143, user policies 149, changing one or more settings of the client device 106 to violate a device policy 143 or user policy 149, or otherwise interfering with the operation of the management agent 156.

The protection agent 133 can periodically compare the device policies 143 or the user policies 149 downloaded to the client device 106 with copies stored in the computing environment 103 or elsewhere to determine whether the policies have been locally modified. Similarly, the protection agent 133 can periodically compare one or more settings of the client device 106 with secured copies of the device policies 143 or user policies 146 to see if a user has changed a setting in a manner that violates a policy. As another example, the protection agent 133 can detect whether a user account on the client device 106 corresponding to the user identifier 146 has been deleted from the client device 106. In response, the protection agent 133 can remove from the client data store 159 the device policies 143, user policies 149, and any data governed by the device policies 143 or user policies 149. The protection agent 133 can also initiate removal of the protection agent 133 itself, the management agent 156, and potentially other applications installed on the client device 106.

The management agent 156 can enforce the device policies 143 or the user policies 149 specified for the client device 106. As an example, the management agent 156 can change settings to conform to those specified in a device policy 143 or a user policy 149. As another example, the management agent 156 can cause applications to be installed on the client device 106 if a device policy 143 or a user policy 149 specifies that the application is to be installed. In other examples, the management agent 156 can modify permissions or other access controls for data (e.g. files or other applications) stored on the client device 106 to prevent or allow particular users access to the data.

Moreover, the client device 106 can include a client data store 159 to cache or otherwise locally store the device identifier 136, enrollment status 139, device policies 143, user identifier 146, and the user policies 149. In some instances, the client data store 159 can contain duplicate copies of device policies 143 or user policies 149. For example, the protection agent 133 and the management agent 156 can have access to separate copies of a device policy 143 or a user policy 149. In these instances, the protection agent 133 can have access to its own copy of a device policy 143 or user policy 149 in order to verify that the policies used by the management agent 153 have not been altered. In some instances, the copies of the device policies 143 or user policies 149 accessible to the protection agent 133 can be encrypted so that only the protection agent 133 can decrypt and access the policies.

The client device 106 can execute applications beyond the protection agent 133 and the management agent 156. These applications can include email applications, social networking applications, word processors, spreadsheets, content access applications, messaging or chat applications, or other applications. In some instances, these additional applications can be downloaded and installed by the management agent 153 in order to bring the client device 106 into compliance with a device policy 143 or user policy 149.

Next, a general description of the operation of the components of the networked environment 100 is provided. To begin, an administrator can use the management console 116 to enable use of the protection agent 133 with the management agent 156 on client devices 106. In some instances, the administrator can enable use of the protection agent 133 for specific client devices 106 or classes of client devices 106 enrolled with the management service 113. In other instances, the protection agent 133 can be enabled for all client devices 106 enrolled with the management service 113.

Subsequently, a user installs the management agent 156 on the client device 106 and then attempts to enroll his or her client device 106 for use with the management service 113, as further described below. As part of the enrollment process, users can provide information about themselves, such as email addresses, user names, passwords, and other information, as well as information about the client device 106 being enrolled, such as the type of device, the owner of the device, and similar information. A corresponding device record 123 can then be created for the client device 106 and, in some instances, default device policies 143 can be added to the device record 123.

After enrollment, the management agent 156 attempts to check-in with the management service 113. The management service 113 determines, as part of the check-in process, whether the client device 106 is required to have the protection agent 133 installed and running If the protection agent 133 is required for the client device 106, then the management service 113 sends a copy of the protection agent 133 to the client device 106. The management agent 156 then causes the protection agent 133 to be installed on the client device 106 and begin execution. The management service 113 then sends one or more device policies 143, one or more user policies 149, and potentially other data, to the client device 106. The management agent 156 configures the client device 106 to comply with the policies sent from the management service 113 while the protection agent 133 records which policies have been sent to the client device 106.

To configure the client device 106, the management agent 156 can perform one or more actions. For example, a device policy 143 can specify that an application be installed on the client device 106. Accordingly, the management agent 153 can download and install the specified application to make the client device 106 comply with the device policy 149. As another example, a user policy 149 can specify that the application be installed while the corresponding user is logged into the client device 106 and removed when the user is not logged into the client device 106. Accordingly, the management agent 153 can monitor the user account to install the application when the user logs in and uninstall the application when the user logs off. In some instances, the management agent 153 can change the values for device settings (e.g. encryption settings, password strength settings, password enforcement, server settings for services, and other settings) to values specified in a device policy 143. Likewise, the management agent 153 can change the values for device settings to values specified in a user policy 149, such as when a corresponding user logs into the client device 106.

Meanwhile, the protection agent 133 can store separate copies of the downloaded device policies 143 and user policies 149 in the client data store 159. The protection agent 133 can further take one or more actions to prevent other applications, including the management agent 153, from accessing these separately stored copies of the device policies 143 and user policies 149. For example, the protection agent 133 can encrypt the separately stored device policies 143 and user policies 149 with a key that is only known to the protection agent 133. Other applications would be unable to decrypt the policies and would therefore be prevented from accessing them. As another example, the protection agent 133 can modify one or more permissions or similar settings (e.g. file system permissions or database permissions) provided by the client data store 159 to prevent applications other than the protection agent 133 from accessing these separately stored policies.

The protection agent 133 can then begin execution on the client device 106 to prevent circumvention of enforcement of the device policies 143 or user policies 149 assigned to the client device 106 by the management agent 153. A user can attempt to circumvent policy enforcement by the management agent 153 through multiple approaches. Examples of some of these approaches and the countermeasures taken by the protection agent 133 are discussed below.

As a first example, a user can attempt to manually modify the values of settings after they have been configured by the management agent 156. For example, a device policy 143 or user policy 149 can require that a firewall be enabled on the client device 106. Accordingly, a user might attempt to disable the firewall after the management agent 156 enabled the firewall to place the client device 106 in compliance with the corresponding device policy 143 or user policy 149. The protection agent 133 can therefore periodically compare the status of the firewall to a value specified by the respective device policy 143 or user policy 149. If the protection agent 133 determines that the firewall is supposed to be enabled, but is currently not enabled, then the protection agent 133 can enable the firewall. Alternatively, the protection agent 133 can send a message to the management agent 156 instructing the management agent 156 to enforce the device policy 143 or user policy 149, resulting in the management agent 156 enabling the firewall again. A similar approach can be taken for other settings specified by device policies 143 or user policies 149.

As a second example, a user can attempt to manually modify the device policies 143 or user policies 149 enforced by the management agent 156. For example, if a device policy 143 specifies that the firewall of the client device 106 had to be enabled, then changing the device policy 143 stored in the client data store 159 to specify that the firewall is to be disabled can cause the management agent 156 to disable the firewall. Accordingly, the protection agent 133 can be configured to have access to its own copies of the device policies 143 assigned to the client device 106 as well as the user policies 149 assigned to the current user of the client device 106. The protection agent 133 can then compare its copies of the device policies 143 and user policies 149 to those that the management agent 156 is enforcing. If the policies differ, the protection agent 133 can replace the copy the management agent 156 is enforcing with the duplicate copy available to the protection agent 133.

As a third example, a user can attempt to delete the user account on the client device 106 through which the management agent 156 enrolled the client device 106. For example, the management agent 156 can enforce one or more restrictions for accessing content stored on the client device 106 specified by a user policy 149. To bypass the access restrictions, a user can delete the user account on the client device 106 and create a new user account on the client device 106. The intent can be for a user to access the restricted content through the newly created user account, bypassing any access restrictions specified by the user policy 149. In response to the deletion of the user account, the protection agent 133 can protect access to the content by deleting the content from the client device 106.

In some instances, the protection agent 133 can further cause the device policies 143, user policies 149, management agent 156, and the protection agent 133 itself to be removed from the client device 106. The protection agent 133 can also delete the values for settings that had been previously modified by the management agent 156 and send a notification the management service 113 that the enrollment status 139 of the client device 106 should be changed to unenrolled. This can prevent additional attempts to circumvent the protections provided by the management agent 153 and protection agent 133 and also bar the client device 106 from being used to access restricted or protected resources, such as protected files, protected networks, protected servers, and similar resources.

Figure 2:
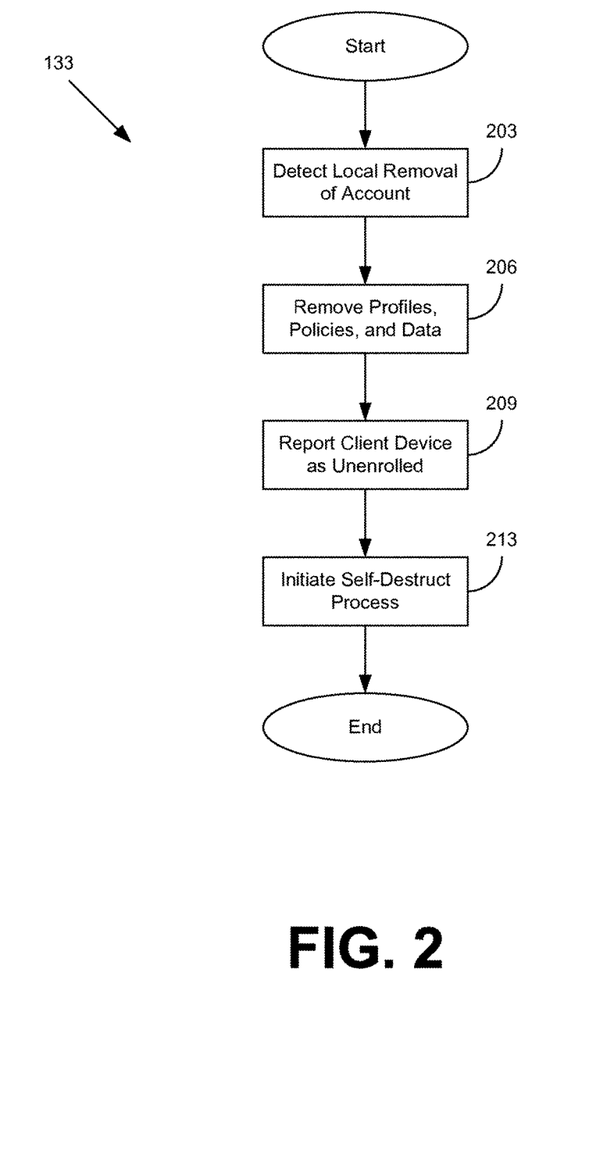
FIG. 2 is a flowchart depicting the operation of an application.

Referring next to FIG. 2, shown is a flowchart that provides one example of the operation of a portion of the protection agent 133. As an alternative, the flowchart of FIG. 2 can be viewed as depicting an example of elements of a method implemented in the networked environment of FIG. 1.

Beginning with step 203, the protection agent 133 can detect whether a user account on the client device 106 associated with the enrollment of the client device 106 has been deleted or removed. The protection agent 133 can detect the removal of the user account through several mechanisms. As a first example, the protection agent 133 can subscribe to receive notifications (e.g. from the operating system of the client device 106 or from the management agent 156) regarding changes to user accounts. When the user account is removed from the client device 106, the protection agent 133 can receive a notification that the user account had been deleted or otherwise removed. As another example, the protection agent 133 can poll database of user accounts, such as a list of users maintained by the operating system of the client device 106. When the protection agent 133 detects that a user account associated with a user identifier 146 is no longer present, the protection agent 133 can determine that the user account had been deleted or otherwise removed. The protection agent 133 can also check for the presence of a certificate locally stored by the management agent 153. Other mechanisms can also be employed to detect whether a user account on the client device 106 associated with the enrollment of the client device 106 has been deleted or removed.

Moving on to step 206, the protection agent 133 can remove all data related to the execution of the management agent 153 and the protection agent 133. For example, if device records 123 or user records 126 (or portions of device records 123 or user records 126) were stored on the client device 106, these can be deleted. As an example, the protection agent 133 can delete one or more of the device identifier 136, the enrollment status 139, the device policies 143, the user identifier 146, or the user policies 149 from the client data store 159.

In addition, the protection agent 133 can remove data on the client device 106 that was subject to a device policy 143 or a user policy 149. For example, if a device policy 143 specified that a particular application be installed on the client device 106, the protection agent 133 can cause the application to be uninstalled. Likewise, if a device policy 143 or user policy 149 prohibits certain users of the client device 106 from accessing particular data on the client device 106, the protection agent 133 can cause this data to be deleted from the client device 106. In some cases, the protection agent 133 can further cause this data to be overwritten with unintelligible data (e.g. a stream of bits all set to "1" or a stream of bits all set to "0") to prevent retrieval of the data through forensic recovery approaches.

Referring next to step 209, the protection agent 133 can send a message to the management service 113 reporting the client device 106 as "unenrolled" or a similar status and requesting that the management service 113 modify the enrollment status 139 of the client device 106 accordingly. For example, the message can request that the management service 113 change the enrollment status 139 of the client device 106 to "unenrolled" or a similar status and also remove the client device 106 from a list of linked devices 153 included in the user record 126 corresponding to the user account. In situations where the client device 106 is unable to communicate across the network 109 with the management service 113, the protection agent 133 can wait to notify the management service 113. For example, if the client device 106 is a mobile device with its network interfaces disabled (e.g. "Airplane Mode"), then the protection agent 133 can wait until one or more network interfaces of the client device 106 are enabled and connected to a network 109 before sending the message to the management service 113.

Proceeding to step 213, the protection agent 133 can initiate a self-destruct process to remove itself and potentially the management agent 153 from the client device 106. As a first step, the protection agent 133 can verify that all necessary policies, applications, profiles or portions of profiles, and other data have been removed from the client device 106, as described previously at step 206. If the removal process described in step 206 has not completed, then the protection agent 133 can wait until step 206 completes before continuing with the self-destruct process of step 213. For example, if step 206 involved an asynchronous filesystem call to delete multiple files, the protection agent 133 can wait for the asynchronous filesystem call to complete before continuing. After verifying that the necessary policies, applications, profiles or portions of profiles, and other data have been removed from the client device 106, the protection agent 133 can then cause the client device 106 to uninstall the management agent 153 and the protection agent 133. The process then ends.

Figure 3:
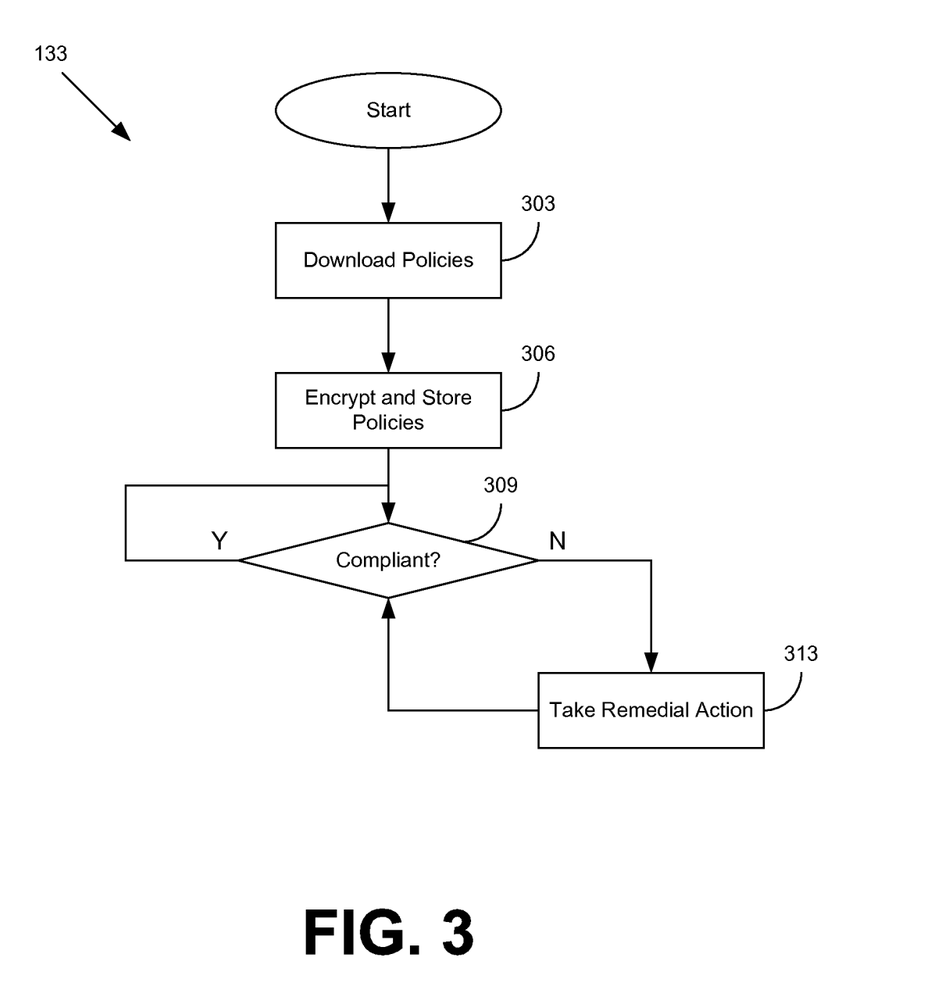
FIG. 3 is a flowchart depicting the operation of an application.

Referring next to FIG. 3, shown is a flowchart that provides one example of the operation of a portion of the protection agent 133. As an alternative, the flowchart of FIG. 3 can be viewed as depicting an example of elements of a method implemented in the networked environment of FIG. 1.

Beginning with step 303, the protection agent 133 downloads or otherwise receives from the management service 113 duplicate copies of any device policies 143 or user policies 149 provided by the management service 113 to the management agent 156. By receiving its own copies of the device policies 143 or user policies 149, the protection agent 133 can detect changes to the policies being enforced by the management agent 156, as further described below.

Referring next to step 306, the protection agent 133 can encrypt and store the received device policies 143 and user policies 149 in the client data store 159. For example, the protection agent 133 can encrypt the device policies 143 and user policies 149 using an encryption key only available to or known to the protection agent 133 in order to prevent other applications from decrypting and accessing the protection agent's 133 copies of the device policies 143 and user policies 149. By storing its own copies of the device policies 143 and user policies 149 locally in the client data store 159, the protection agent 133 can continue to detect and prevent user attempts to circumvent management agent 156 even when the client device 106 is disconnected from a network 109.

Moving on to step 309, the protection agent 133 can perform one or more checks to determine whether the client device 106 continues to be in compliance with the device policies 143 and user policies 149 provided by the management service 113 to the management agent 156. Several examples are provided below. If the protection agent 133 determines that the client device 106 is compliant, the protection agent 133 can wait for a predefined period of time and then repeat step 309. However, if the protection agent 133 determines that the client device 106 is in a non-compliant state, the process would proceed to step 313.

For example, the protection agent 133 can determine whether the current state of the client device 106 is in compliance with the applicable device policies 143 and user policies 149. In one instance, the protection agent 133 can compare the value of a setting of the client device 106 to a value for the setting specified in an applicable device policy 143 or user policy 149. If the values mismatch, the protection agent 133 can determine that the client device 106 fails to comply with the applicable device policy 143 or user policy 149. For example, if a device policy 143 specifies that a particular proxy server is to be used to access web pages, and the client device 106 is not configured to use the specified proxy server, then the client device 106 can be considered non-compliant. Depending on the implementation, the protection agent 133 can rely on its own copy of the device policy 143 or user policy 149 or the protection agent 133 can rely on the copy of the device policy 143 or the user policy 149 used by the management agent 156.

As another example, the protection agent 133 can determine whether the policies that the management agent 156 is enforcing have been altered. The protection agent 133 can decrypt and compare its copies of the device policies 143 and user policies 149 applicable to the client device 106 to the copies of the policies available to the management agent 156. If the policies differ, then the protection agent 133 can determine that the policies that the management agent 156 is enforcing have been altered, and that the client device 106 is currently in a non-compliant state.

Proceeding next to step 313, the protection agent 133 can take one or more remedial actions to return the client device 106 to a compliant state. For example, if a value for a setting on the client device 106 fails to match the value specified in the applicable device policy 143 or user policy 149, the protection agent 133 can take one of several actions. As a first example, the protection agent 133 can notify the management agent 156 of the mismatch and request that the management agent "reapply" the applicable device policy 143 or user policy 149 in order to change the setting to the required value. Second, the protection agent 133 can change the value of the setting itself to match the value specified in the protection agent's 133 copy of the applicable device policy 143 or user policy 149. As a third example, if one or more of the device policies 143 or user policies 149 enforced by the management agent 156 have been altered, the protection agent 133 can replace these policies with its own copies of the device policies 143 or user policies 149. Once the remedial action has been taken, the process returns to step 309 so that the protection agent 133 can continue to monitor the client device 106 for compliance with the applicable device policies 143 and user policies 149.

The flowcharts of FIGS. 2 and 3 show an example of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although flowcharts of FIGS. 2 and 3 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages can be added to the logical flow described herein, for purposes of enhanced utility, accounting, performance measurement, or troubleshooting aid. It is understood that all of these variations are within the scope of the present disclosure.

The computing environment 103 and the client device 106 or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The computing environment 103, the client device 106, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing logic functions upon an application of one or more data signals, application specific integrated circuits (ASICs) having appropriate logic gates, programmable logic devices (for example, field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, and flash memory. Further, any logic or component described herein can be implemented and structured in a variety of ways. One or more components described can be implemented as modules or components of a single application. Further, one or more components described herein can be executed in one computing device or by using multiple computing devices.

The above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

Therefore, the following is claimed:

1. A system, comprising:
    a computing device comprising a processor and a memory;
    a first application comprising machine-readable instructions stored in the memory that, when executed by the processor, cause the computing device to at least:
        monitor a second application to detect a deletion of a user account initiated locally on the computing device, wherein the user account is associated with an enrollment of the computing device with a management service;
        identify data subject to a policy received from the management service;
        delete the data from the memory of the computing device; and
        report the deletion of the user account to the management service.

2. The system of claim 1, wherein the first application further causes the computing device to delete a value for a setting of the computing device, wherein the value for the setting was previously set to place the computing device in compliance with the policy.

3. The system of claim 1, wherein the first application further causes the computing device to at least uninstall the first application from the computing device.

4. The system of claim 1, wherein the first application further causes the computing device to at least delete the policy from the memory of the computing device.

5. The system of claim 1, wherein the data comprises a third application installed on the computing device to place the computing device in compliance with the policy.

6. The system of claim 1, wherein causing the computing device to delete the data from the memory of the computing device comprises causing the computing device to overwrite the data in the memory of the computing device with a stream of bits, wherein each bit in the stream of bits is set to the same value.

7. The system of claim 1, wherein the computing device comprises a mobile device.

8. A method, comprising:
    monitoring, with a first application, a second application executing in a computing device to detect a deletion of a user account on a computing device by the second application, wherein the deletion is initiated locally on the computing device and the user account is associated with an enrollment of the computing device with a management service;
    identifying, with the first application, data stored in a memory of the computing device that is subject to a policy received from the management service;
    deleting, with the first application, the data from the memory of the computing device; and
    reporting, with the first application, the deletion of the user account to the management service.

9. The method of claim 8, further comprising deleting, with the first application, a value for a setting of the computing device, wherein the value for the setting was previously set to place the computing device in compliance with the policy.

10. The method of claim 8, further comprising deleting, with the first application, the policy from the memory of the computing device.

11. The method of claim 8, wherein the data comprises a third application installed on the computing device to place the computing device in compliance with the policy.

12. The method of claim 8, wherein deleting, with the first application the data from the memory of the computing device comprises overwriting the data in the memory of the computing device with a stream of bits, wherein each bit in the stream of bits is set to the same value.

13. The method of claim 8, wherein the computing device comprises a mobile device.

14. A non-transitory computer readable medium comprising machine readable instructions embodying a first application that, when executed by a processor of a computing device, cause the computing device to at least:
monitor a second application executing on the computing device to detect a deletion of a user account on the computing device initiated with the second application, wherein the deletion is initiated locally on the computing device and the user account is associated with an enrollment of the computing device with a management service;
identify data stored in a memory of the computing device that is subject to a policy received from the management service;
delete the data from the memory of the computing device;
report the deletion of the user account to the management service.

15. The non-transitory computer readable medium of claim 14, wherein the machine readable instructions further cause the computing device to at least delete a value for a setting of the computing device, wherein the value for the setting was previously set to place the computing device in compliance with the policy.

16. The non-transitory computer readable medium of claim 14, wherein the machine readable instructions further cause the computing device to at least delete the policy from the memory of the computing device.

17. The non-transitory computer readable medium of claim 14, wherein the machine readable instructions further cause the computing device to at least remove the machine readable instructions from the computing device.

18. The non-transitory computer readable medium of claim 14, wherein the data comprises a third application installed on the computing device to place the computing device in compliance with the policy.

19. The non-transitory computer readable medium of claim 14, wherein causing the computing device to delete the data from the memory of the computing device comprises causing the computing device to overwrite the data in the memory of the computing device with a stream of bits, wherein each bit in the stream of bits is set to the same value.

20. The non-transitory computer readable medium of claim 14, wherein the computing device comprises a mobile device.

* * * * *